Figure 1:
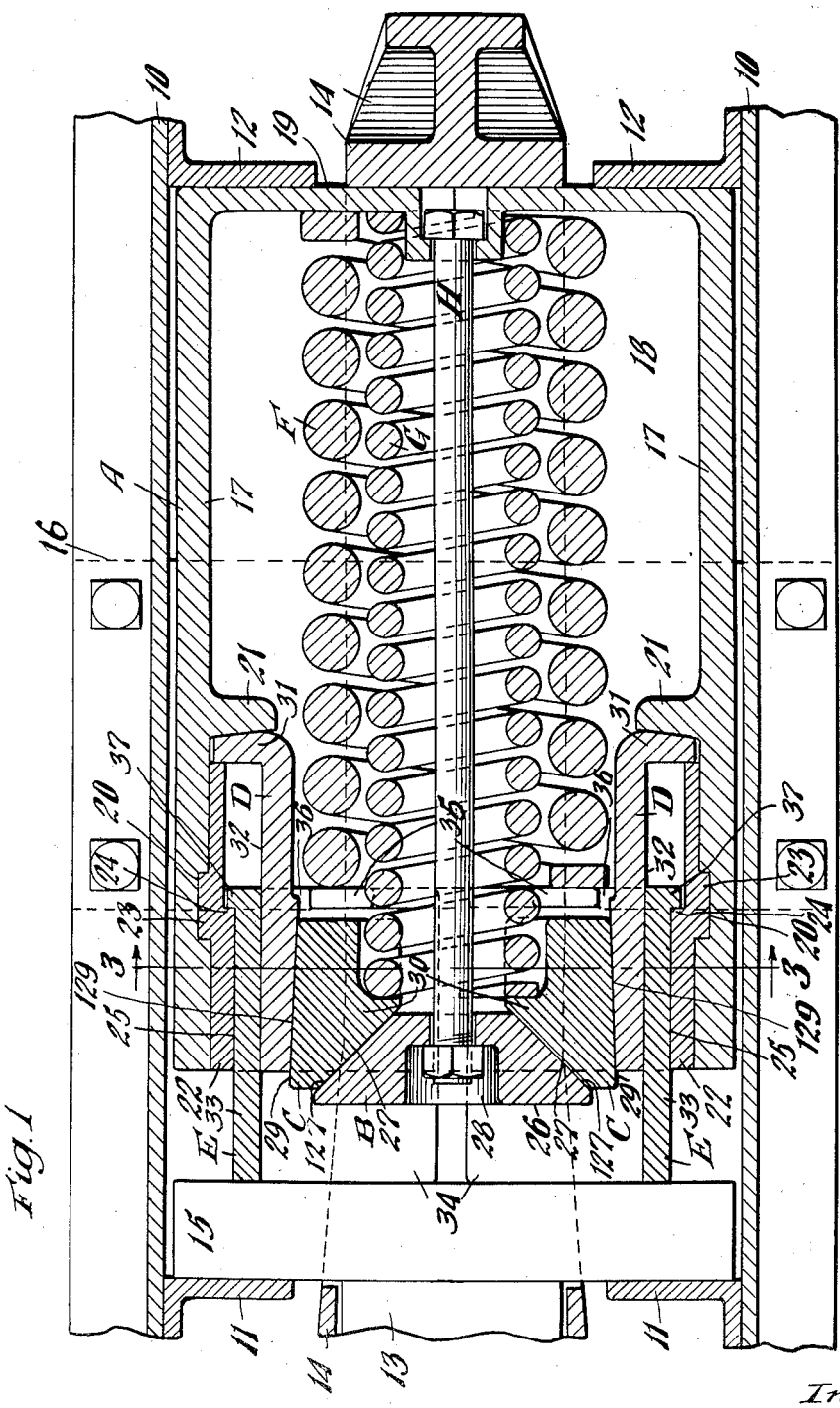

Dec. 4, 1928.

J. F. O'CONNOR 1,693,816

FRICTION SHOCK ABSORBING MECHANISM

Filed Nov. 4, 1927  2 Sheets-Sheet 1

Witness
Wm. Geiger

Inventor
John F. O'Connor
By George L. Haight
His Atty.

Dec. 4, 1928.  1,693,816
J. F. O'CONNOR
FRICTION SHOCK ABSORBING MECHANISM
Filed Nov. 4, 1927   2 Sheets-Sheet 2
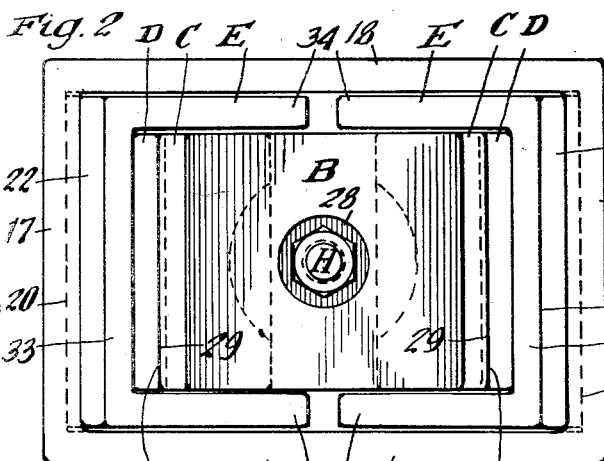
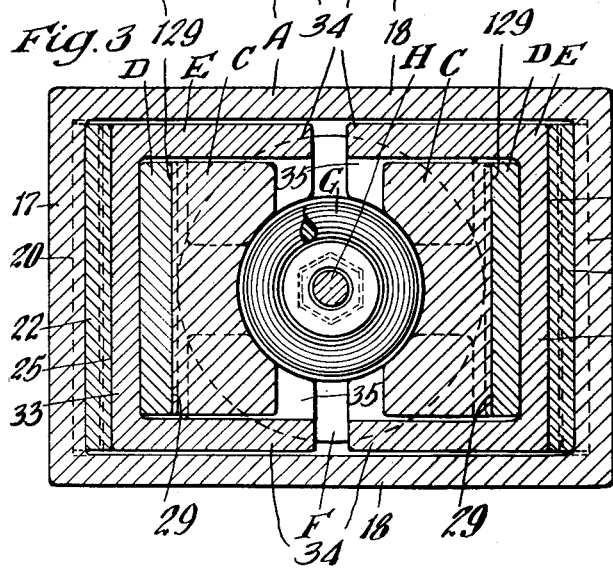
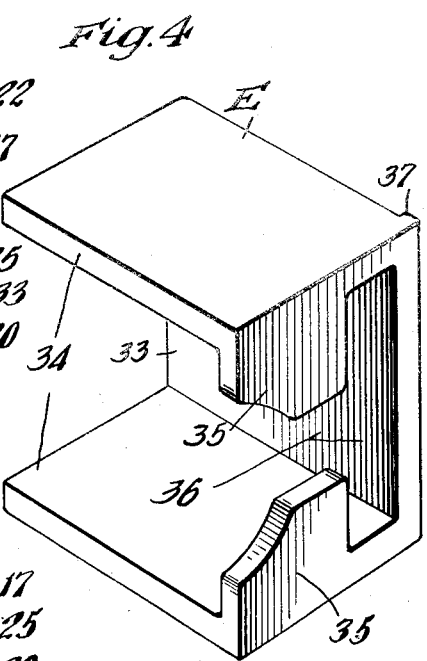
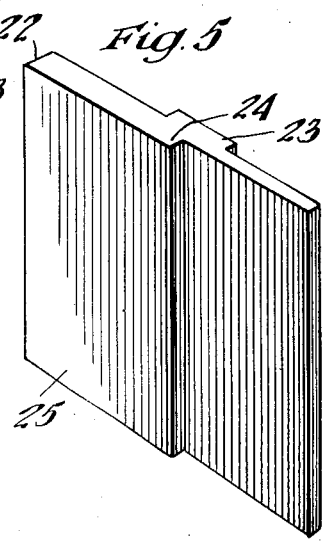
Witness
Wm. Geiger
Inventor
John F. O'Connor
By George J. Haight
His Atty.

Patented Dec. 4, 1928.

1,693,816

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed November 4, 1927. Serial No. 230,942.

This invention relates to improvements in friction shock absorbing mechanisms.

One object of the invention is to provide a friction shock absorbing mechanism especially adapted for railway draft riggings having mainly spring action during the major portion of the compression stroke to absorb the normal shocks, and affording heavy resistance during the remainder of the compression stroke by the addition of frictional resistance and increased spring resistance, the mechanism including a column element provided with friction surfaces, with which movable friction elements co-operate, resisted by spring means, and a lateral pressure creating friction wedge system co-operating with relatively fixed plates which also co-operate with the movable friction elements wherein the friction system becomes operative during the latter part of the compression stroke to produce the heavy resistance.

A more specific object of the invention is to provide a friction shock absorbing mechanism of the character indicated including a casing having interior friction surfaces at one end thereof to provide a friction shell, the remainder of the casing serving as a spring cage, a wedge block, friction shoes co-operating with the wedge block, relatively fixed friction plates co-operating with the shoes, movable friction elements interposed between the fixed plates and the friction surfaces of the shell section, a spring resistance means opposing inward movement of the shoes, and an additional heavier spring resistance opposing inward movement of the friction plates and normally maintaining the outer ends of the movable elements projected beyond the wedge to receive the actuating force during the first part of the compression stroke of the mechanism.

Other objects and advantages of the invention will more fully and clearly appear from the description and claims hereinafter following.

In the drawings forming a part of this specification, Fig. 1 is a horizontal, longitudinal sectional view of a portion of a railway draft rigging illustrating my improvements in connection therewith. Fig. 2 is a front end elevational view of the improved shock absorbing mechanism proper. Fig. 3 is a transverse vertical sectional view corresponding substantially to the line 3—3 of Fig. 1. Fig. 4 is a detailed perspective view of one of the friction elements employed in connection with my improved mechanism, and Fig. 5 is a detailed perspective view of a liner employed in connection with the friction shell.

In said drawings, 10—10 indicate channel shaped center or draft sills of a railway car underframe, to the inner sides of which are secured the usual front stop lugs 11—11 and rear stop lugs 12—12. The inner end portion of the draw bar is designated by 13, to which is operatively connected a yoke 14 of well known form. The shock absorbing mechanism proper and a front main follower 15 are disposed within the yoke. The yoke and the parts therewithin are supported in operative position by a detachable saddle plate 16 secured to the draft sills.

The improved friction shock absorbing mechanism, as shown, comprises broadly a casing A; a wedge B; two friction shoes C—C; two fixed friction plates D—D; two movable friction elements E—E; spring resistance means comprising elements F and G; and a retainer bolt H.

The casing A is in the form of a substantially rectangular box-like casting having longitudinally disposed vertical side walls 17—17, horizontally disposed longitudinally extending top and bottom walls 18—18 and a vertical transverse rear end wall 19. The end wall 19 co-operates with the rear stop lugs 12 in the manner of the usual rear follower. At the forward end, the side walls 17 of the casing A are vertically slotted as indicated at 20, thereby providing seats. Rearwardly of the seats 20 both of the side walls 17 are provided with vertically disposed inwardly projecting abutment ribs 21—21. At the forward end portion, the casing A is provided with liners 22—22. Each of the liners 22 is in the form of a substantially rectangular flat plate like member having a vertically disposed rib 23 on the outer side thereof. As most clearly shown in Fig. 1, the ribs 23 of the liners 22 are seated within the seats 20 of the side walls 17, and are thus anchored to the casing A against longitudinal movement with respect thereto. As most clearly shown in Figs. 1 and 5 each of the liners 22 is cut away on the inner side at the rear end thereof, thereby providing transversely disposed short abutment shoulders 24, for the purpose hereinafter pointed out. Each liner 22 is provided with a longitudinally disposed flat friction surface 25 on the inner side thereof. The liners 22 are of such a length that a clearance is left between the inner ends of the liners and the abutment ribs 21 of the casing A.

The wedge B is in the form of a solid block provided with a flat front end face 26 adapted to be engaged by the inner side of the main follower 15 during the compression stroke of the mechanism to force the wedge inwardly of the casing A. On the inner side the wedge block B is provided with a pair of wedge faces 27—27 on the opposite sides thereof. The wedge block is recessed as indicated at 28 to accommodate the nut of the retainer bolt H.

The friction shoes C are disposed at opposite sides of the wedge block. Each shoe C is provided with a flat outer friction surface 29. On the inner side the shoe C is laterally enlarged as indicated at 30, the enlargement 30 of each shoe being provided with a wedge face 127 on the forward side thereof, adapted to co-operate with the wedge face 27 at the corresponding side of the wedge block B.

The fixed friction plates D are disposed at opposite sides of the casing A, each plate D being provided with an outwardly extending vertical flange 31 at the rear end thereof. The flange 31 is of such a width as to occupy the entire clearance space between the corresponding rib 21 and the inner end of the liner 22 at the same side of the mechanism. Inasmuch as the flange 31 engages between the inner end of the liner and the rib 21, the plate D is held against longitudinal movement with respect to the casing A. As shown in Fig. 1, a slight clearance is left between the outer edge of the flange 31 of each plate D and the side wall of the casing, thus permitting slight lateral movement of the plate D, this being necessary in the operation of the gear. In addition to serving as an anchoring means for the plates D, the ribs 21 also assist in preventing inward movement of the liners, as the inner ends of the liners bear on the flanges 31 of the plates D. On the inner side each plate D is provided with a flat friction surface 129 adapted to co-operate with a friction surface 29 of the friction shoes C at the same side of the mechanism. As most clearly shown in Fig. 1 the opposite friction surfaces 129 of the plates D are preferably converged inwardly of the mechanism. On the outer side, each plate D is provided with a friction surface 32 extending the entire length of the plate.

The friction elements E, which are disposed at opposite sides of the mechanism, are of similar design. Each element E comprises a vertically disposed plate like section 33 and top and bottom inwardly extending flange-like sections 34—34. At the forward end the friction element E is provided with an end wall 35 cut away, as most clearly shown in Fig. 4, and indicated at 36, to receive the friction plates D, and also accommodate the spring resistance element G. The end wall 35 serves as a spring follower section co-operating with the spring resistance element F. As clearly illustrated in Figs. 1, 2 and 3 the plate like sections 33 of the friction elements E are interposed between the fixed friction plates D and the liners 22. Each friction element E is provided with a vertically disposed outwardly projecting rib 37 at the rear end thereof adapted to co-operate with the abutment shoulder 24 of the liner 22 at the same side of the mechanism. By engagement of the rib 37 with the abutment shoulder 24 outward movement of the friction element E is positively limited. Upon reference to Figs. 2 and 3 it will be seen that the wedge block, friction shoe C and the friction plates D are of such a height as to be accommodated between the top and bottom flanges 34 of the two friction elements E. In this connection it is pointed out that the flange 34 of the friction elements E thus serve as protecting means for preventing injury to the top and bottom walls 18 of the casing by the wedge and friction shoes in their movement during compression and release of the mechanism. In addition the flanges 34, due to their great width, serve as wear-plates to reduce the wear between the friction elements and the top and bottom walls of the casing.

The spring resistance means which comprises an inner coil G and an outer coil F is disposed within the casing A, and both coils have the rear ends thereof bearing on the end wall 19 of the casing. The outer coil F which, as shown, is considerably heavier than the coil G has the front end thereof bearing directly on the end walls 35 of the movable friction elements E. The inner coil G, as shown, is longer than the coil F and extends through the openings in the end walls 35 of the friction elements E and has the front end thereof bearing on the enlargements 30 of the friction shoes C.

The mechanism is held assembled and of overall uniform length by the retainer bolt H, which has the head thereof anchored in a hollow boss projecting inwardly from the end wall 19 of the casing A. The nut of the bolt H is accommodated within the recess 28 of the wedge block B. In addition to holding the parts assembled, the retainer bolt H also maintains the spring resistance element G under initial compression, thus compensating for wear of the various friction and wedge faces of the mechanism. It will be clear that due to the initial compression under which the spring resistance G is placed, the friction shoes C will be urged outwardly against the wedge faces of the block B, and will thus be spread apart, thereby maintaining the friction surfaces of the shoes, friction elements E and the liners 22 in contact. The spring resistance F is also preferably made of such a length that it will be under initial compression when the mechanism is assembled.

In assembling my improved shock-absorbing mechanism, the main spring resistance elements F and G are placed within the casing A; the liners 22, and the movable friction elements E are then placed in position and the fixed plates inserted, with the flanges 31 thereof interposed between the inner ends of the liners 22 and the ribs 21 of the casing. The friction shoes C and wedge block B are then placed in position, and the wedge block anchored to the casing A by the retainer bolt H. When the parts have been thus assembled it will be seen that the normal position of the parts, as shown in Figure 1, is such that the friction elements E will project a considerable distance beyond the outer face of the wedge block B to receive the actuating force from the main follower 15 during a considerable portion of the first part of the compression stroke.

The operation of my improved shock absorbing mechanism, assuming a compression stroke, is as follows: The main follower 15 and the casing A will be moved relatively toward each other, and the friction elements E will be carried inwardly of the casing A against the resistance of the spring F. Inasmuch as the spring resistance G is only under slight initial compression, the wedging action produced thereby is very slight and there is no appreciable amount of friction created between the elements E and friction plates D and the liners of the casing. The inward movement of the friction elements E will continue until the clearance between the main follower 15 and the wedge block B is taken up, whereupon the wedge block B will be forced inwardly of the casing A, forcing apart the shoes C, movement of which is resisted by the spring G. Due to the wedging action thus produced, the fixed plates D and the friction elements E will be compressed between the shoes and the liners 22, thus forcing the friction surfaces of these parts into tight engagement. During the described action, the friction shoes C will also be forced inwardly of the casing A along the converging friction surfaces 127 of the plates D. While the shoes are being moved inwardly along the friction surfaces of the plates D, the friction elements E will also continue their inward movement, due to the rearward movement of the main follower 15, sliding on the friction surface 25 of the liners 22. It will be evident that during the last named action, the resistance of the gear is greatly augmented, due to the friction produced between the parts and the additional resistance offered by the central spring element G. The described action will continue either until the actuating force is reduced, or the main follower 15 comes into engagement with the front end of the casing A. Upon engagement of the follower 15 with the casing A the latter will act as a column load transmitting member to transmit the force directly to the stop lugs and prevent undue compression of the springs F and G. In release of the mechanism upon the actuating force being reduced, the expansive action of the springs F and G will force the friction elements E, the friction shoes C and the wedge block B outwardly. The friction shoes C will move outwardly until the wedge block B engages the nut of the retainer bolt. The friction elements E will be forced outwardly by the spring F until movement of the same is limited by engagement of the ribs 37 thereof with the shoulders 24 of the liners 22. The friction elements E will thus assume the position illustrated in Fig. 1, wherein they are shown in engagement with the main follower 15, and with their outer ends spaced a considerable distance forwardly of the wedge block B.

From the foregoing description taken in connection with the drawings, it will be evident that I have provided a friction shock absorbing mechanism having mainly spring resistance during a considerable portion of the compression stroke followed by greater or higher capacity produced by frictional resistance, and additional spring resistance, thereby adapting the gear specially for passenger equipment. The parts are preferably so proportioned that the mechanism will absorb the usual shocks to which a passenger equipment is subjected in ordinary practice without the friction elements being actuated to produce frictional resistance, the frictional resistance of the mechanism being thus available to absorb abnormally heavy shocks.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a column element having longitudinally disposed friction surfaces; of a wedge block; friction shoes, cooperating with the wedge block; relatively stationary friction plates held against longitudinal movement with respect to the column element and having frictional engagement with the shoes; movable friction elements interposed between the friction surfaces of the column element and the stationary plates, said movable elements having their outer ends normally projected beyond the wedge to receive the actuating force during the first part of the compression stroke; and separate spring resistance means respectively opposing inward movement of the shoes and movable friction elements.

2. In a friction shock absorbing mechanism, the combination with a casing having a friction shell section at one end thereof provided with interior friction surfaces; of a wedge block; friction shoes co-operating with the wedge block; relatively stationary plates anchored to the casing against longitudinal movement and having engagement with the friction shoes; movable friction elements interposed between the friction surfaces of the casing and the stationary plates, said movable elements having their outer ends projecting beyond the wedge to receive the actuating force during the first part of the compression stroke; spring resistance means opposing movement of the shoes; and a heavier spring resistance means opposing movement of the friction elements.

3. In a friction shock absorbing mechanism, the combination with a combined spring cage and friction shell; of a wedge block; friction shoes having wedging engagement with the block; stationary friction plates anchored to the cage; movable friction elements interposed between the stationary plates and the walls of the friction shell section of the cage; and a main spring resistance comprising inner and outer coils, the inner coil co-operating with the shoes, and the outer coil co-operating with the friction elements.

4. In a friction shock absorbing mechanism, the combination with a casing having interior friction surfaces at one end thereof; friction elements co-operating with said friction surfaces; means for limiting the outward movement of the friction elements; a wedge block; friction shoes having wedging engagement with the block; stationary friction plates anchored to the casing against longitudinal movement; means for limiting outward movement of the wedge to hold the same spaced inwardly from the outer ends of the friction elements in the normal full release position of the mechanism; and separate spring resistance means respectively opposing inward movement of the shoes and movable friction elements.

5. In a friction shock absorbing mechanism, the combination with a main follower; of a casing, said casing and main follower being movable relatively toward and away from each other, said casing being provided with interior friction surfaces at one end thereof; movable friction elements co-operating with the friction surfaces of the casing and engaged by the main follower; a wedge block normally spaced from the main follower; friction shoes having wedging engagement with the wedge block; stationary friction elements interposed between the friction shoes and the movable friction elements, said elements being anchored to the casing against longitudinal movement; and separate spring resistance means opposing inward movement of the shoes and movable friction elements.

6. In a friction shock absorbing mechanism, the combination with a casing having a friction shell section at one end thereof, defined by detachable liners secured to the side walls of the casing; of movable friction elements adapted to receive the actuating force during the entire compression stroke of the mechanism and cooperating with the friction shell section; fixed friction elements having engagement with the movable friction elements, said fixed friction elements being anchored to the casing and having flanges thereon engaging between ribs formed on the casing walls and the inner ends of the liners; friction shoes cooperating with the friction surfaces of the fixed friction elements; wedge means engaging the shoes; and spring resistance means opposing inward movement of the shoes and inward movement of the movable friction elements.

In witness that I claim the foregoing I have hereunto subscribed my name this 1st day of November, 1927.

JOHN F. O'CONNOR.